United States Patent
Bharti et al.

(10) Patent No.: US 11,575,582 B2
(45) Date of Patent: Feb. 7, 2023

(54) SERVICE CHAIN BASED NETWORK SLICING

(71) Applicant: International Business Machines Corporation, Armonk, NY (US)

(72) Inventors: Harish Bharti, Pune (IN); Rajesh Kumar Saxena, Maharashtra (IN); Sandeep Sukhija, Rajasthan (IN); Deepak Bajaj, Leicester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/323,192

(22) Filed: May 18, 2021

(65) Prior Publication Data
US 2022/0385541 A1 Dec. 1, 2022

(51) Int. Cl.
*H04L 41/14* (2022.01)
*H04L 12/46* (2006.01)
*H04L 67/51* (2022.01)
*H04L 67/1001* (2022.01)

(52) U.S. Cl.
CPC ........ *H04L 41/145* (2013.01); *H04L 12/4641* (2013.01); *H04L 67/1001* (2022.05); *H04L 67/51* (2022.05)

(58) Field of Classification Search
CPC ............... H04L 41/145; H04L 12/4641; H04L 67/1002; H04L 67/16; H04L 41/14; H04L 12/46; H04L 67/1001; H04L 67/51; H04L 67/06; H04L 67/10
USPC ......................................................... 709/226
See application file for complete search history.

(56) References Cited

U.S. PATENT DOCUMENTS

| | | | | |
|---|---|---|---|---|
| 11,456,893 | B1* | 9/2022 | Paczkowski | .......... G06F 16/137 |
| 2016/0353367 | A1* | 12/2016 | Vrzic | ................ H04W 28/0221 |
| 2018/0376338 | A1* | 12/2018 | Ashrafi | ................. H04W 16/10 |
| 2019/0150158 | A1* | 5/2019 | Farmanbar | ........ H04W 28/0247 |
| | | | | 370/329 |
| 2019/0199637 | A1 | 6/2019 | Paramasivam | |
| 2020/0195495 | A1* | 6/2020 | Parker | ................... H04L 41/082 |
| 2020/0275359 | A1* | 8/2020 | Bordeleau | ........... H04L 41/0806 |
| 2022/0124547 | A1* | 4/2022 | Young | ............... H04W 28/0247 |

FOREIGN PATENT DOCUMENTS

CN 108965024 A 12/2018

OTHER PUBLICATIONS

BH, et al., "Optimal Virtual Network Function Placement in Multi-Cloud Service Function Chaining Architecture." Published Feb. 2017. 19 pages. In Computer Communications. 102. Published by Research Gate. https://www.researchgate.net/publication/314011091.

(Continued)

*Primary Examiner* — Tonia L Dollinger
*Assistant Examiner* — Mehulkumar J Shah
(74) *Attorney, Agent, or Firm* — Aaron N. Pontikos; Jared L. Montanaro

(57) ABSTRACT

A processor may identify one or more sources. The processor may identify a respective requirement of each of the one or more sources. The processor may determine if a respective requirement is different than another respective requirement. The processor may locate each of the one or more sources in a respective slice on a different container available in a server of a network.

20 Claims, 5 Drawing Sheets

(56) References Cited

OTHER PUBLICATIONS

Carpio, et al., "VNF placement with replication for Load balancing in NFV networks." Published in 2017. 6 pages. In 2017 IEEE International Conference on Communications (ICC), pp. 1-6. Published by IEEE. https://ieeexplore.ieee.org/document/7996515.

Mell, et al., "The NIST Definition of Cloud Computing," Recommendations of the National Institute of Standards and Technology, U.S. Department of Commerce, Special Publication 800-145, Sep. 2011, 7 pgs.

Sattar, et al., "DSAF: Dynamic Slice Allocation Framework for 5G Core Network." Published May 9, 2019. 6 pages. Published by ARXIV. https://arxiv.org/abs/1905.03873.

Sattar, et al., "Towards Secure Slicing: Using Slice Isolation to Mitigate DDoS Attacks on 5G Core Network Slices." Published in 2019. 9 pages. In 2019 IEEE Conference on Communications and Network Security (CNS), pp. 82-90. Published by IEEE. https://ieeexplore.ieee.org/document/8802852.

\* cited by examiner

SERVICE CHAIN BASED NETWORK SLICING

BACKGROUND

The present disclosure relates generally to the field of network modeling, and more specifically to service chain based network slicing.

Historically, there has been a one-size-fits-all approach in regard to network modeling. However, the existing market is now composed of different applications like machine-type communications, ultra-reliable low latency communications and enhanced mobile broadband content delivery. Accordingly, network slicing comes out to be an essential technique in 5G networks, where the network slice approach is to slice an original physical network architecture into multiple logical and independent networks that can be configured to meet various requirements of services.

SUMMARY

Embodiments of the present disclosure include a method, computer program product, and system for service chain based network slicing. A processor may identify one or more sources. The processor may identify a respective requirement of each of the one or more sources. The processor may determine if a respective requirement is different than another respective requirement. The processor may locate each of the one or more sources in a respective slice on a different container available in a server of a network.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
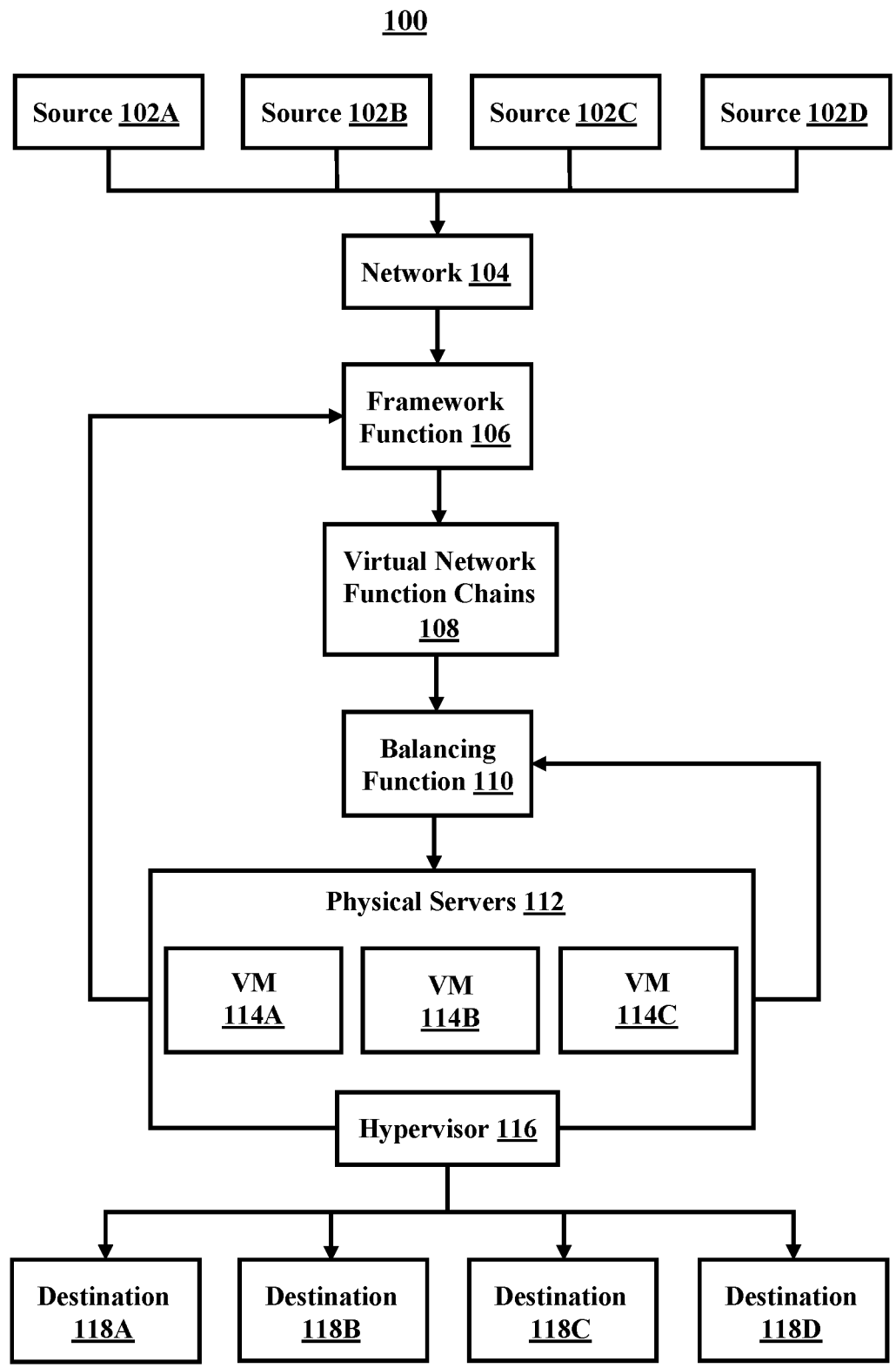
FIG. 1 illustrates a block diagram of an exemplary system for service chain based network slicing, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of network modeling, and more specifically to service chain based network slicing. While the present disclosure is not necessarily limited to such applications, various aspects of the disclosure may be appreciated through a discussion of various examples using this context.

The historical methodology of one-size-fits-all for a network model has been employed since 2G and is no longer appropriate for addressing the existing market scenarios where networks are composed of different applications, such as, machine-type communications, ultra-reliable low latency communications, and enhanced mobile broadband content delivery. Accordingly, network slicing comes out to be an essential technique in 5G networks to realize such wide varieties and contrasting quality of service requirements leveraging a single physical infrastructure of network. The thought behind the network slice approach is to slice the original physical network architecture into multiple logical and independent networks that can be configured to meet various requirements of services.

All different network slices share the same common infrastructure. Most of the slices are applied in different techniques, technologies and segments, with each slice having a dedicated physical resource usage, logical network resource reservation, and dedicated bandwidth spectrum. All these methods coexist or build on top of the same resource and are employed depending on SLA requirements of services. However, this introduces new challenges, e.g., runtime problems like guaranteed execution of slice instance on distributed network and/or compute ontologies. Also providing guaranteed execution in such an environment is a problem, as overly centralized solutions severely limit the scale, while distributed approaches fail to achieve consistency with concurrency, therefore falling short of providing guarantees in runtime.

With the advent of virtualized service functions like security anchor function, authentication server function, several user functions, etc. that are available on servers sitting in any data center, an ordered rule of execution can be defined, which is known as a service chain. The concept of a service chain has opened most of the paradigms to network architects. Packets are classified to be processed by a chain of service functions, which will be instantiated as per the requirement. Before instantiation of any service chain it needs to be ensured that end-to-end delay should be known prior to this as some internet-of-things (IoT) scenarios demand higher fidelity and low latency. The system also needs to ensure that proper handoff should work between the network slices with proper isolation in place.

Accordingly, disclosed herein is a method/framework to provide a solution for providing guaranteed estimates of end-to-end (E2E) delay in slices, intra-slice isolation for slice allocation and provide a minimum delay path between slice components.

With the advent of virtualized service functions in data centers through which all traffic is routed, a highly scalable, agile and load balanced solution is achieved. Virtualized service functions also mean that now, most of the work that is done in application layer is available to the network layer as well. Consequently, all these virtualized service functions are available on servers termed as service servers, which are commissioned in a data center. In this framework, the virtual network function (VNF) is optimized by implementing an algorithm at the service server being placed at a controlling data center of a 5G core network. The novelty with the proposed framework is:

There is a guaranteed allocation of slices across a single network, which ensures a service chain is assigned to links and servers that provide a least delay, have enough bandwidth, and provide isolation to each slice;

Intra-slice isolation for slice allocation, and assurance that SLAs on each slice across a single network infrastructure, which includes identification of a least utilized server for the slice and calculation of throughput considering the network latency;

A balancing function for load balance. In some embodiments, placement for the VNF in an optimal manner intrinsically builds the load balancing function. This may be achieved by a construct of maximizing an objective function of a graph that has availability of servers as nodes and availability of links that act as edges. In some embodiments, the balancing function is adjusted for load balancing between a node and link. The balancing function for individual use is permitted, or it can be part of a proposed minimized programming function. Further, the balancing function provides the capability of load balancing either at links or servers;

Provisioning of intra-slice isolation for increased reliability. In some embodiments, there are chances that different slices contain complex service chain logic and to make both slices ideally isolated, the system may put slices on different containers in available servers that are unutilized. This helps find a minimum delay path between slice components; and Guaranteed end to end calculated delay before provisioning of service chain.

Before turning to the FIGS., it is noted that in 5G networks, an end-to-end network slice is a complete logical network that includes Radio Access Network (RAN) and Core Network (CN), and it has capabilities to provide different telecommunication services. Further, a slice could have several components, e.g., an Authentication Server Function, a Security Anchor Function, a Session Management Function, an Application Function, and/or several User Plane Functions with on-demand service chaining between them. The present disclosure objective is to design a framework as shown in FIG. 1, which is discussed below, where an available network slice will be tested against the following requirements: guaranteed end-to-end delay, provided intra-slice isolation for slice allocation, and a found minimum delay path between slice components.

Accordingly, referring now to FIG. 1, illustrated is a block diagram of an exemplary system 100 for service chain based network slicing, in accordance with aspects of the present disclosure. As depicted, the system 100 includes sources 102A-D, which could be any type of computing device (e.g., smart phone, IoT device, agricultural sensor, e-health device, connected car, etc.), a network 104 (e.g., cloud network), a framework function 106, virtual network function chains 108, a balancing function 110, physical servers 112 with virtual machines (VMs) 114A-C and an integrated hypervisor 116 (which may generate and run the VMs 114A-C), and destinations 118A-D.

In some embodiments, all the different sources 102A-D, which have different requirements, are put in slices on different containers in available server(s) (e.g., physical servers 112) of the network 104 that are unutilized. The framework function 106 is then utilized to define any service chain, which ensures that it is assigned to links and servers that provide a least delay. In some embodiments, the framework function 106 identifies/determines the path with the least delay between slice components and/or determines an assignment of a network slice to least utilized servers (of the network 104).

In some embodiments, three conditions of "optimal" are expressed as constraints and the service chain is the link of providing network function as a virtualized core construct (e.g., VMs 114A-C). In some embodiments, the system 100 is optimized against these three conditions of being optimal, e.g., optimal (least delay) if assigned to different servers, optimal if delay incurred along the entire path and processing delay of each virtual network function, and computing and bandwidth of an entire datacenter.

In some embodiments, various virtual network function chains 108 are initiated and the balancing function 110 provides/allows load balance of the sources 102A-D on the system 100. In some embodiments, the sources 102A-D, after balancing, are placed on one or more VMs 114A-C of the physical servers 112. In some embodiments, all various destinations 118A-D are then configured for functioning as per system 100 requirements.

Turning away from the depiction of FIG. 1 for a moment, detailed now is a more in-depth analysis of how the system 100 can function. In some embodiments, the framework/system 100 optimizes Virtual Network Functions (VNF) by implementing an algorithm at a Service Server (e.g., one of the physical servers 112) being placed in a controlling data center of a 5G core network. The algorithm can determine/identify a placement for the VNF in an optimal manner that intrinsically builds the load balancing function 110, provides a provision of intra-slice isolation for increased reliability, and predicts end-to-end delay within each slice.

In some embodiments, core functions are mapped to limiting variables as follows: each request on the VNF is associated with a VNF resource demand 'θ'; each request on the VNF is associated with a bandwidth demand 'λ'; each slice is provisioned with a restricting end-to-end delay 'ε'; and each slice thus provisions a prescribed reliability 'μ'. These functions are then optimized for a service chain to provision a predetermined function as 'F'. Since a service chain functions as a graph, it can be represented as $G_F$. The objective is to provision θ, λ, ε, and μ across $G_F$ optimally.

In some embodiments, a model may be (pre)defined for this progression as an extensive iteration with known information, for instance, a directed graph $G_F=(V_F,E_F)$ to express a service chain request has been used. In such an embodiment, the set of vertices $V_F$ include all virtualized evolved packet core (EPC) elements, and each vertex in the graph is associated with a resource demand 'θ'. The edges are then denoted by $(i,j) \in E_F$, while their bandwidth demands are expressed by λ.

The 5G core is then built by a pool of nodes so that interconnections between the nodes $V_S$ is called by $E_S$ and depicted as a undirected graph $GS=(E_S,V_S)$. In such an embodiment, let a,b be a graph such that $(a,b) \in ES$, then their capacities ψ are denoted as $\psi_a$ and $\psi_b$. If, a VNF 'I' is assigned to a node 'a' it will be denoted by $\alpha_a^i$. The bandwidth is then allocated to the node (a,b) over the virtual link (I,j) is $\lambda_{a,b}^{i,j}$. A load balancing variable (e.g., load balancing function 110) then operates as a feasibility indicator for placing VNF (for a given 'I') to a node 'a' $\xi_a^i$.

In such an embodiment, following the expressions above, a mixed integer formulation expressing the assignment of 'i' to the EPC node 'a' can be generated:

Assigning the slice mode to the least utilized server:

$$\sum_{i \in V_F} \sum_{a \in V_S} \left( \frac{\psi_{a-max} - \psi_a}{\psi_{a-max}} \right) \theta^i \alpha_a^i \xi_a^i \quad (1)$$

Here, $\xi_a^i$ is used to avoid infeasible mapping of the VNF/server combination;

Now considering a physical link (a,b) having a delay of $\mho$. Each time a virtual link $(i,j) \in E_F$ is assigned to a physical link $(u,v) \in E_S$, it increases $\mho_{a,b}$. Considering $\mho_{a,b}$ as a function to capture link utilization and, $\hat{\Delta}$, as agreed latency EPC, it will have $\mho_{a,b-init}$ to capture the initial delay assigned to (a, b), then, $$\mho a, b = \left(\frac{\psi_{a-max} - \psi_a}{\psi_{a-max}}\right)\hat{\Delta} + \mho_{a,b-init} \quad (2)$$

From equation (1) and equation (2), minimizing both terms will result in the assignment of a network slice to the least utilized servers, and it will find a path with least delay between the slice components.

In some embodiments, the path with a least delay is found by three constraints:

If the slice has requested that each VNF needs to be assigned to different physical servers (112), a constraint will provide:

$$\Sigma_{i \in V_F} \alpha_a^i \leq \mu :: \forall a \in V_S; \mu \in \mathbb{N} \quad (3)$$

In some embodiments, the end-to-end delay for the 5G network is an important requirement. This constraint enforces the end-to-end delay requirement for the core network slice. It includes the delay incurred along the entire path and the processing delay of each VNF and it can be represented as:

$$\sum_{i,j \in V_F} \sum_{a,b \in V_S, a \neq b} \left(\frac{\hat{\lambda}_{a,b}^{i,j}}{\lambda_{a,b}} \mho a, b\right) \quad (4)$$

Since partial or incomplete assignment of slice components serves no purpose, the last constraint ensures that the remaining computing $\theta$ and bandwidth capacity $\psi$ of the entire datacenter is enough to accommodate the slice creation request, and it can be represented as:

$$\Sigma_{i \in V_F} \theta^i \leq \Sigma_{a \in V_F} \psi_a \quad (5), \text{ and/or}$$

$$\Sigma_{(i,j) \in V_F} \theta^i \leq \Sigma_{(a,b) \in V_F} \psi_b \quad (6)$$

From equations (4)-(6), the framework/system 100 will give the constraints that will satisfy the stated objectives, e.g., guarantee end-to-end delay ($\mho$) and provide intra-slice isolation for slice allocation ($\mu$).

In some embodiments, the remaining objective of finding a minimum delay path between the slice components can be obtained from equation (2) with the following modification:

$$\Sigma_{i,j \in V_F} \Sigma_{a,b \in V_S, a \neq b} (\hat{\lambda}_{a,b}^{i,j} \cdot \mho a,b) \quad (7)$$

Now, to define an optimization construct (subject to equations (3)-(6)), equations (1) and (7) can be combined and minimized to:

$$\sum_{i \in V_F} \sum_{a \in V_S} \left(\frac{\psi_{a-max} - \psi_a}{\psi_{a-max}}\right) \theta^i \alpha_a^i \xi_a^i + \sum_{i,j \in V_F} \sum_{a,b \in V_S, a \neq b} (\hat{\lambda}_{a,b}^{i,j}, \mho a, b) \quad (8)$$

The objective of this construct is load balancing as expressed by the objective function equation (8). The first term of this function represents the amount of CPU resources multiplied by the utilization of each assigned server. Similarly, the second term of the objective function expresses the accumulated bandwidth assigned to EPC links multiplied by the corresponding link utilization.

In some embodiments, the link-to-node balancing factor $\beta$ can be introduced. If $\beta \gg 1$, it provides solutions for link load balancing, and if $\beta \ll 1$, it balances the load among the servers.

Thus $\beta$ adjust to strike a balance between node and link load balancing, from equation (5), (6), and (8) and can be represented as:

$$\beta = \frac{\lambda_{links}}{\lambda_{servers}} \cdot \frac{\sum_{a \in V_f} \psi_a}{\sum_{(a,b) \in V_F} \psi_b} \quad (9)$$

$\beta$ is thus employed for normalization of the resources and the bandwidth units. Placement for the VNF is thus handled in an optimal manner with $\beta$ intrinsically building the load balancing function.

Figure 2:
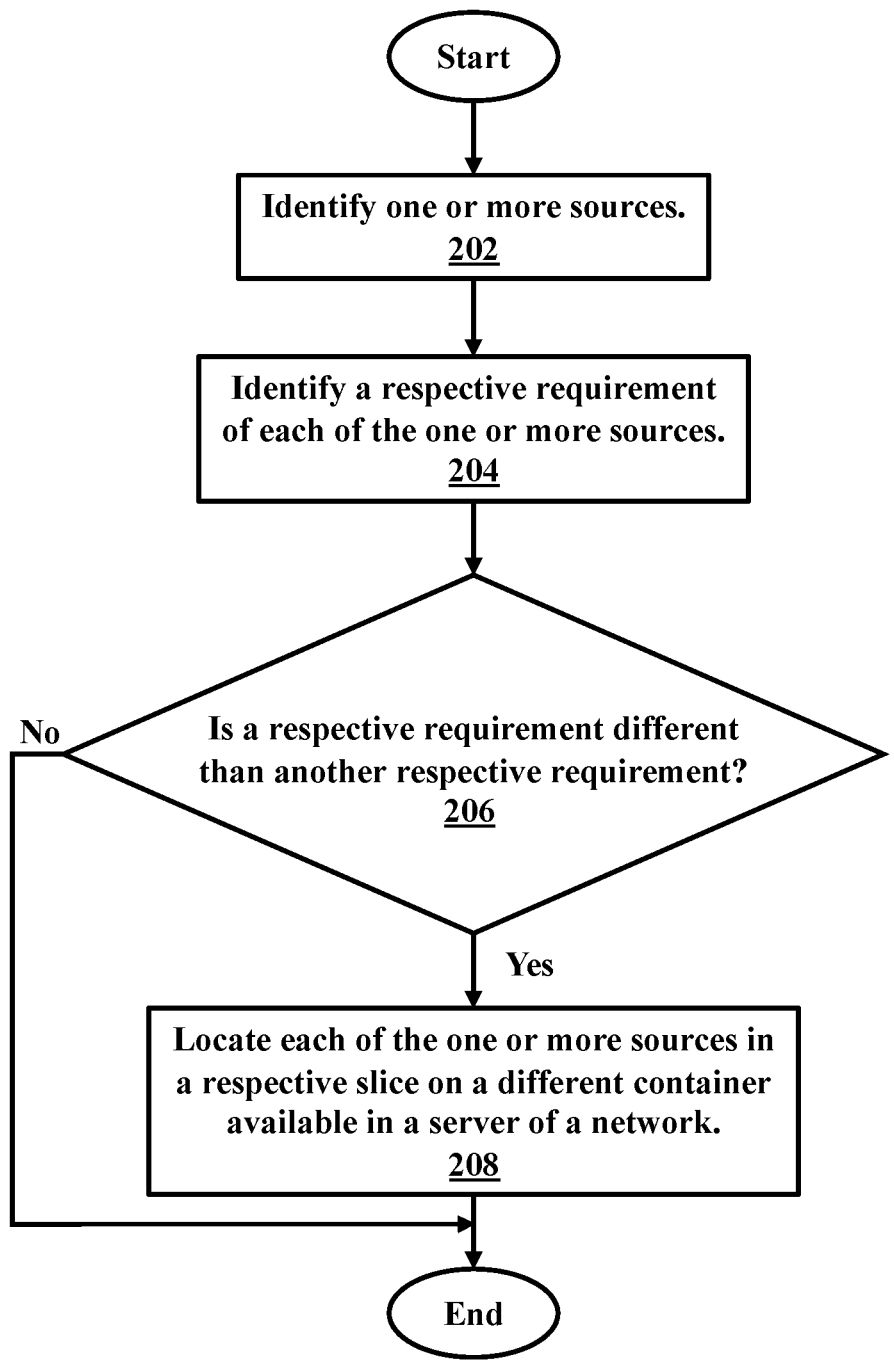
FIG. 2 illustrates a flowchart of an exemplary method for service chain based network slicing, in accordance with aspects of the present disclosure.

Referring now to FIG. 2, illustrated is a flowchart of an exemplary method 200 for service chain based network slicing, in accordance with aspects of the present disclosure. In some embodiments, the method 200 may be performed by a processor (e.g., of the system 100, of a computing device, server, etc.).

In some embodiments, the method 200 begins at operation 202, where the processor may identify one or more sources (e.g., smart phones, sensors, etc.). The method 200 may proceed to operation 204, where the processor may identify a respective requirement of each of the one or more sources (e.g., processing power needed, bandwidth needed, etc.).

In some embodiments, the method 200 may proceed to decision block 206, where the processor may determine/identify if a respective requirement is different than another respective requirement (e.g., source 1 has different computing requirements compared to source 2 and perhaps the sources cannot be processed together based on the requirements). In some embodiments, if at decision block 206, it is determined that the requirements are the same, the method 200 may end and the sources may be processed without slicing.

In some embodiments, if at decision block 206, it is determined that the requirements are different, the method 200 may proceed to operation 208, where the processor locates/places each of the one or more sources in a respective slice on a different container available in a server of a network. In some embodiments, after operation 208, the method 200 may end.

In some embodiments, discussed below, there are one or more operations of the method 200 not depicted for the sake of brevity. Accordingly, in some embodiments, the processor may analyze one or more framework functions. In some embodiments, the one or more framework functions define a service chain. In some embodiments, the processor may assign, based on the one or more framework functions, each of the one or more sources. Each of the one or more resources may be assigned to respective links and servers of the service chain that provide a least delay (e.g., in computing, processing, functioning, utilization of resources, etc.).

In some embodiments, the one or more framework functions include optimal conditions. Where the optimal conditions are expressed as constraints and the service chain is a link for providing a network function as a virtualized core construct. In some embodiments, the virtualized core construct is optimized against the constraints.

In some embodiments, the processor may initiate one or more virtual network function chains. In some embodiments, the one or more virtual network function chains are the service chain. In some embodiments, the processor may initialize a balancing function, where the balancing function allows for a load balance (of sources, resources, a network, a system, etc.). The processor may identify that the load is balance. In some embodiments, if the load is balance, the sources may be sent to respective destinations and/or containers. In some embodiments, if the load is not balanced, the load may be optimized until the load is balanced.

In some embodiments, the processor may send each of the one or more sources to various destinations. The processor may confirm that the various destinations are configured for functioning per one or more respective requirements.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
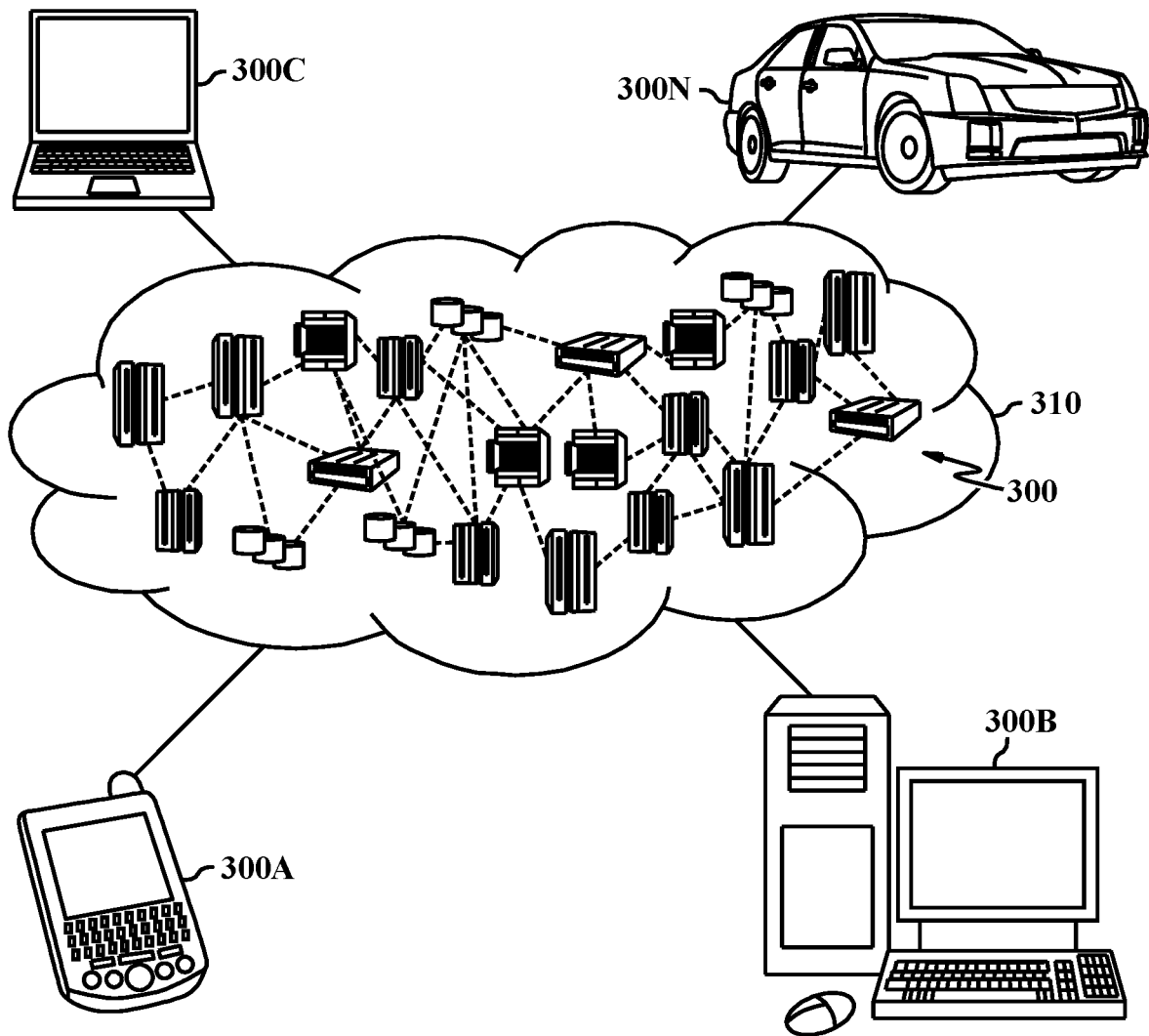
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
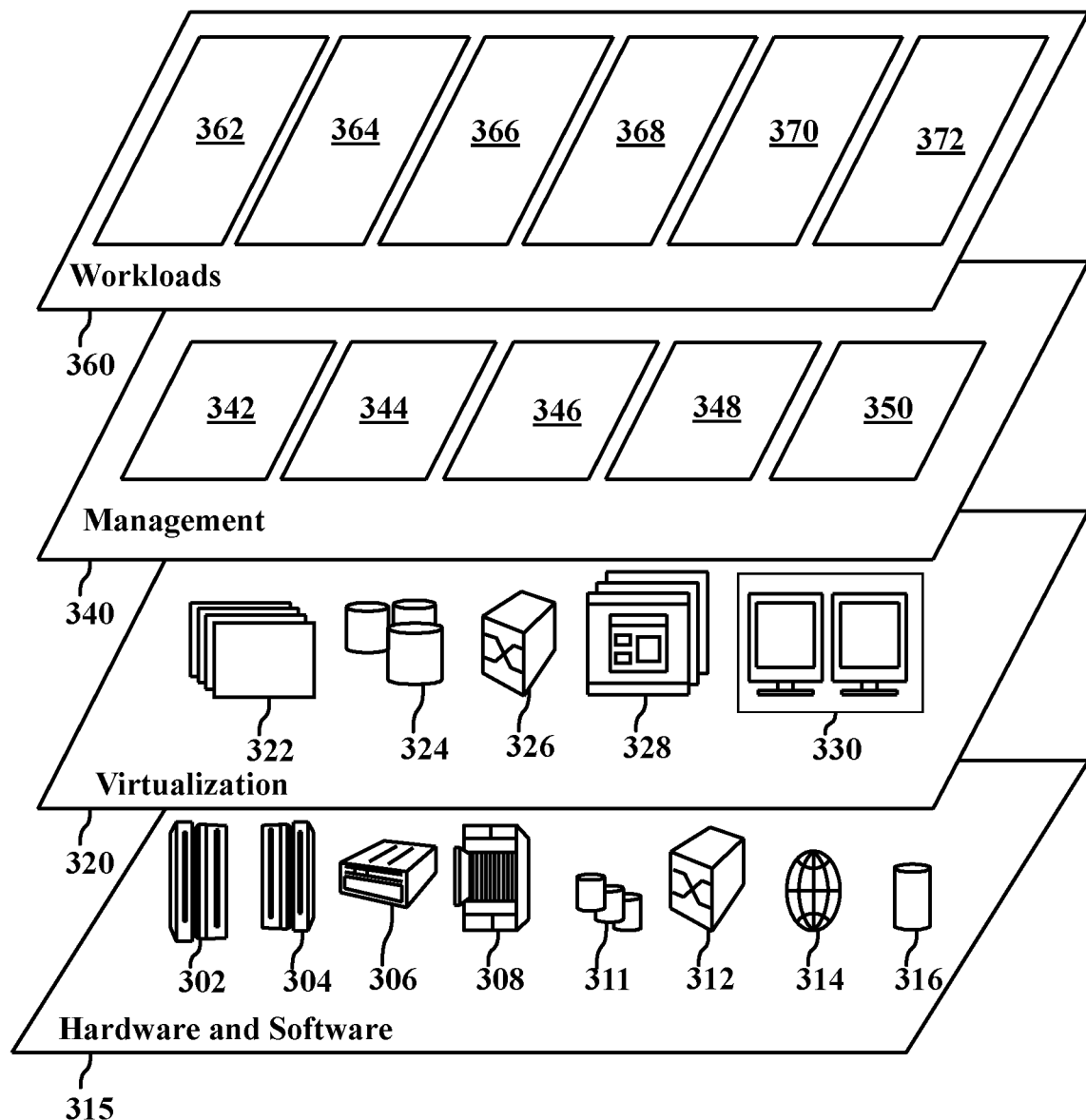
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and service chain based network slicing 372.

Figure 4:
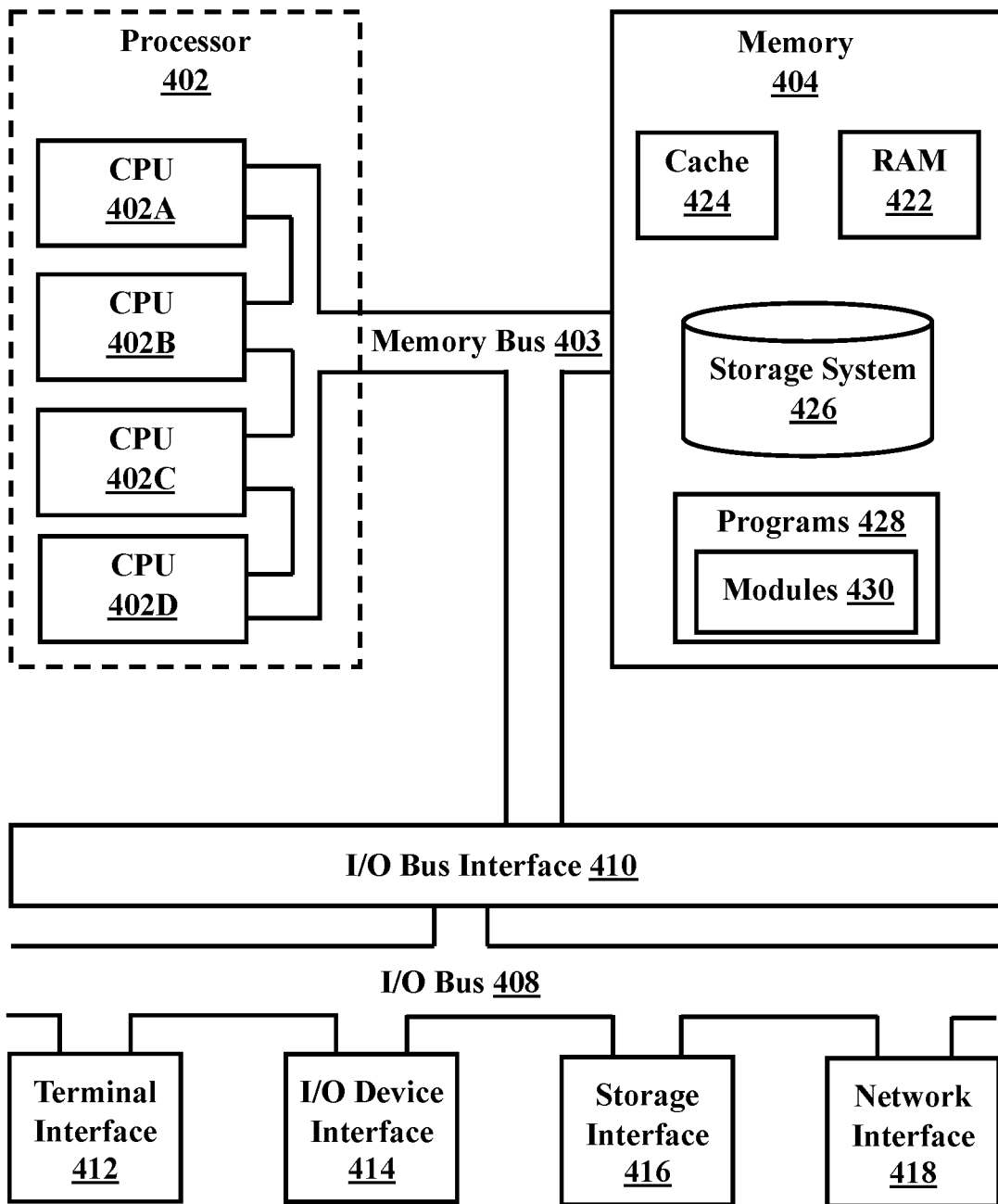
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for service chain based network slicing, the method comprising:
   identifying, by a processor, one or more sources;
   identifying a respective requirement of each of the one or more sources;
   determining if a respective requirement is different than another respective requirement;
   locating respective virtual network functions (VNFs) of a network slice for a first source of the one or more sources in a between a set of least utilized servers of a network, wherein the set of least utilized servers is determined based, at least in part, on (i) an amount of CPU resources multiplied by a utilization of each assigned server, and (ii) an accumulated bandwidth assigned to evolved pack core (EPC) links multiplied by a corresponding link utilization.

2. The method of claim 1, further comprising:
   analyzing one or more framework functions, wherein the one or more framework functions define a service chain; and
   assigning, based on the one or more framework functions, each of the one or more sources, wherein each of the one or more resources are assigned to respective links and servers of the service chain that provide a least delay.

3. The method of claim 2, wherein the one or more framework functions include optimal conditions, wherein the optimal conditions are expressed as constraints and the service chain is a link for providing a network function as a virtualized core construct.

4. The method of claim 3, wherein the virtualized core construct is optimized against the constraints.

5. The method of claim 4, further comprising:
   initiating one or more virtual network function chains, wherein the one or more virtual network function chains are the service chain.

6. The method of claim 5, further comprising:
   initializing a balancing function, wherein the balancing function allows for a load balance; and
   identifying that the load is balanced.

7. The method of claim 6, further comprising:
   sending each of the one or more sources to various destinations; and
   confirming that the various destinations are configured for functioning per one or more respective requirements.

8. A system for service chain based network slicing, the system comprising:
   a memory; and
   a processor in communication with the memory, the processor being configured to perform operations comprising:
   identifying one or more sources;
   identifying a respective requirement of each of the one or more sources;
   determining if a respective requirement is different than another respective requirement;
   locating respective virtual network functions (VNFs) of a network slice for a first source of the one or more sources between a set of least utilized servers of a network, wherein the set of least utilized servers is determined based, at least in part, on (i) an amount of CPU resources multiplied by a utilization of each assigned server, and (ii) an accumulated bandwidth assigned to evolved pack core (EPC) links multiplied by a corresponding link utilization.

9. The system of claim 8, the processor being further configured to perform operations comprising:
   analyzing one or more framework functions, wherein the one or more framework functions define a service chain; and
   assigning, based on the one or more framework functions, each of the one or more sources, wherein each of the one or more resources are assigned to respective links and servers of the service chain that provide a least delay.

10. The system of claim 9, wherein the one or more framework functions include optimal conditions, wherein the optimal conditions are expressed as constraints and the service chain is a link for providing a network function as a virtualized core construct.

11. The system of claim 10, wherein the virtualized core construct is optimized against the constraints.

12. The system of claim 11, the processor being further configured to perform operations comprising:
   initiating one or more virtual network function chains, wherein the one or more virtual network function chains are the service chain.

13. The system of claim 12, the processor being further configured to perform operations comprising:
   initializing a balancing function, wherein the balancing function allows for a load balance; and
   identifying that the load is balanced.

14. The system of claim 13, the processor being further configured to perform operations comprising:
   sending each of the one or more sources to various destinations; and
   confirming that the various destinations are configured for functioning per one or more respective requirements.

15. A computer program product comprising a computer readable storage medium having program instructions embodied therewith, the program instructions executable by a processor to cause the processor to perform operations, the operations comprising:
   identifying one or more sources;
   identifying a respective requirement of each of the one or more sources;
   determining if a respective requirement is different than another respective requirement;
   locating respective virtual network functions (VNFs) of a network slice for a first source of the one or more sources in a between a set of least utilized servers of a network, wherein the set of least utilized servers is determined based, at least in part, on (i) an amount of CPU resources multiplied by a utilization of each assigned server, and (ii) an accumulated bandwidth assigned to evolved pack core (EPC) links multiplied by a corresponding link utilization.

16. The computer program product of claim 15, the processor being further configured to perform operations comprising:
   analyzing one or more framework functions, wherein the one or more framework functions define a service chain; and
   assigning, based on the one or more framework functions, each of the one or more sources, wherein each of the one or more resources are assigned to respective links and servers of the service chain that provide a least delay.

17. The computer program product of claim 16, wherein the one or more framework functions include optimal conditions, wherein the optimal conditions are expressed as constraints and the service chain is a link for providing a network function as a virtualized core construct.

18. The computer program product of claim 17, wherein the virtualized core construct is optimized against the constraints.

19. The computer program product of claim 18, the processor being further configured to perform operations comprising:
   initiating one or more virtual network function chains, wherein the one or more virtual network function chains are the service chain.

20. The computer program product of claim 19, the processor being further configured to perform operations comprising:
   initializing a balancing function, wherein the balancing function allows for a load balance;
   identifying that the load is balanced;
   sending each of the one or more sources to various destinations; and
   confirming that the various destinations are configured for functioning per one or more respective requirements.

* * * * *